United States Patent
Kim et al.

(10) Patent No.: US 9,955,348 B2
(45) Date of Patent: Apr. 24, 2018

(54) METHOD AND DEVICE FOR REQUESTING FOR SPECIFIC RIGHT ACQUISITION ON SPECIFIC RESOURCE IN WIRELESS COMMUNICATION SYSTEM

(71) Applicant: LG ELECTRONICS INC., Seoul (KR)

(72) Inventors: Seongyun Kim, Anyang-si (KR); Seungkyu Park, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/421,063

(22) PCT Filed: Sep. 12, 2013

(86) PCT No.: PCT/KR2013/008266
§ 371 (c)(1),
(2) Date: Feb. 11, 2015

(87) PCT Pub. No.: WO2014/042446
PCT Pub. Date: Mar. 20, 2014

(65) Prior Publication Data
US 2015/0245205 A1 Aug. 27, 2015

Related U.S. Application Data

(60) Provisional application No. 61/699,873, filed on Sep. 12, 2012, provisional application No. 61/737,102, filed on Dec. 14, 2012.

(51) Int. Cl.
*H04W 12/06* (2009.01)
*H04W 12/08* (2009.01)
(Continued)

(52) U.S. Cl.
CPC .............. *H04W 12/06* (2013.01); *H04L 63/08* (2013.01); *H04W 4/005* (2013.01); *H04W 12/08* (2013.01); *H04W 72/10* (2013.01)

(58) Field of Classification Search
CPC ..... H04W 12/06; H04W 4/005; H04W 12/08; H04W 72/10; H04W 4/00; H04L 9/00;
(Continued)

(56) References Cited

U.S. PATENT DOCUMENTS

2007/0198436 A1* 8/2007 Weiss ................... G06F 21/32
705/75
2009/0063520 A1* 3/2009 Kimura ............... G06F 21/6218
(Continued)

FOREIGN PATENT DOCUMENTS

CN          1607484 A      4/2005
CN        101380121 A      2/2009
(Continued)

OTHER PUBLICATIONS

ETSI TS 102 690 v.1.1.1 (Oct. 2011): Machine-to-Machine communications (M2M); Functional architecture.*

Primary Examiner — Ashok Patel
Assistant Examiner — Quazi Farooqui
(74) Attorney, Agent, or Firm — Birch, Stewart, Kolasch & Birch, LLP

(57) ABSTRACT

A method by which a resource management entity requests for acquisition of a specific right on a specific resource in a wireless communication system, according to one embodiment of the present invention, comprises the steps of: receiving a search request for a specific resource from a first application entity, wherein the search request includes a search word for identifying the specific resource; acquiring information on resource candidates among resources being managed, on the basis of the search word; transmitting the
(Continued)

information on the resource candidates to the first application entity; receiving an acquisition request for a specific right on a first resource among the resource candidates from the first application entity; and determining whether the first application entity has a right on the acquisition request for the specific right, wherein whether the first application entity has a right on the acquisition request for the specific right can be determined on the basis of information indicated by a first attribute of a second resource for verifying a resource right acquisition request, which is lower than the first resource.

18 Claims, 10 Drawing Sheets

(51) Int. Cl.
*H04L 29/06* (2006.01)
*H04W 4/00* (2009.01)
*H04W 72/10* (2009.01)

(58) Field of Classification Search
CPC ..... H04L 9/32–9/3297; H04L 63/04–63/0492; H04L 63/08–63/0892; H04L 29/06; G06F 15/16; G06F 21/30–21/46; G06F 21/60–21/645; G06F 9/00
USPC .............. 726/4, 17–18, 28–30; 713/182–185
See application file for complete search history.

(56) References Cited

U.S. PATENT DOCUMENTS

| | | |
|---|---|---|
| 2011/0196966 A1 | 8/2011 | Chai et al. |
| 2011/0218999 A1 | 9/2011 | Kan et al. |
| 2012/0210401 A1* | 8/2012 | Pepin .................... H04L 63/101 726/4 |

FOREIGN PATENT DOCUMENTS

| | | | |
|---|---|---|---|
| KR | 10-2010-0011142 A | 2/2010 | |
| KR | 10-2010-0026874 A | 3/2010 | |
| WO | WO 2012/068465 A1 | 5/2012 | |
| WO | WO 2012109531 A2 * | 8/2012 | ............ H04W 4/001 |

* cited by examiner (a)

(b)

(a)

(b)

METHOD AND DEVICE FOR REQUESTING FOR SPECIFIC RIGHT ACQUISITION ON SPECIFIC RESOURCE IN WIRELESS COMMUNICATION SYSTEM

CROSS REFERENCE TO RELATED APPLICATIONS:

This application is the National Phase of PCT International Application No. PCT/KR2013/008266, filed on Sep. 12, 2013, which claims priority under 35 U.S.C. 119(e) to U.S. Provisional Application No. 61/699,873, filed on Sep. 12, 2012, and to U.S. Provisional Application No. 61/737,102, filed on Dec. 14, 2012, all of which are hereby expressly incorporated by reference into the present application.

TECHNICAL FIELD

The present invention relates to a method and a device for requesting specific rights acquisition on a specific resource in a wireless communication system.

BACKGROUND ART

Entering the ubiquitous era, M2M (Machine to Machine) communication technology is drawing attention. M2M communication technology is under study by many standard development organizations (SDOs) such as TIA, ATIS, ETSI and oneM2M. In M2M environments, communication between M2M related applications (network application/gateway application/device application) occurs and different entities may operate an M2M server part (e.g. common service entity (CSE)) and a network application, and thus there is a need for standardization for rights acquisition on necessary resources when data exchange with corresponding applications is required. Further, communication between M2M server parts occurs in a multi-M2M service provider environment. Even in this case, standardization is needed since different entities may operate the M2M server parts.

Accordingly, the present invention provides a mechanism in which an entity, which requests rights on resources, requests rights acquisition/change on a specific resource, a resource manager is notified of the request, a response to the request is received and the response is provided to the entity.

DISCLOSURE

Technical Problem

An object of the present invention devised to solve the problem lies in a procedure for requesting rights acquisition or change for a specific resource in a wireless communication system.

The technical problems solved by the present invention are not limited to the above technical problems and those skilled in the art may understand other technical problems from the following description.

Technical Solution

In an aspect of the present invention, a method for requesting acquisition of a specific right on a specific resource in a wireless communication system, the method performed by a resource management entity includes: receiving a search request for the specific resource from a first application entity, wherein the search request includes a search term for identifying the specific resource; acquiring information about resource candidates from among resources being managed based on the search term; transmitting the information about the resource candidates to the first application entity; receiving, from the first application entity, an acquisition request for a specific right on a first resource from among the resource candidates; and determining whether the first application entity has a right for the acquisition request for the specific right on the first resource, wherein whether the first application entity has a right for the acquisition request for the specific right on the first resource is determined based on information indicated by a first attribute of a second resource for verifying a resource rights acquisition request, under the first resource.

Preferably, the method may further include transmitting the acquisition request for the specific right on the first resource to an entity having a right to change a right on the first resource if it is determined that the first application entity has a right for the acquisition request for the specific right on the first resource.

Preferably, the method may further include specifying an entity having a right to change a right on the first resource based on information indicated by an attribute in which information about a right on the first resource is recorded, and the attribute may be under the first resource.

Preferably, when a plurality of entities has a right to change the right on the first resource, the entity having a right to change the right on the first resource may be specified according to the first application entity or specified as a dedicated entity designated to change the right on the first resource, from among the plurality of entities.

Preferably, the acquisition request for the specific right on the first resource from among the resource candidates received from the first application entity may be a command for recording the specific right and information about the first application entity requesting acquisition of the specific right, in a second attribute of the second resource.

Preferably, the acquisition request for the specific right on the first resource from among the resource candidates received from the first application entity may a command for authentication of the acquisition request for the specific right on the first resource, wherein the authentication is based on whether information about the first application entity and the specific right are recorded in a resource indicated by an attribute in which information about a right on the first resource is recorded, and the resource may be under the first resource.

Preferably, the method may further include recording the specific right and the information about the first application entity requesting acquisition of the specific right in a second attribute of the second resource if it is determined that the first application entity has a right for acquisition request of the specific right on the first resource.

Preferably, the method may further include notifying one or more specific lower entities, indicated by an attribute of a third resource, of change of the second resource or the second attribute when the specific right and the information about the entity requesting acquisition of the specific right are recorded in the second attribute of the second resource.

Preferably, the method may further include receiving result of the acquisition request for the specific right on the first resource, from an entity having a right to change the right on the first resource.

Preferably, if the acquisition request for the specific right on the first resource is accepted, the specific right and the information about the first application entity requesting acquisition of the specific right may be recorded in a resource indicated by the attribute in which the first resource right information is recorded, and the resource may be under the first resource.

Preferably, a right in a narrower range than the specific right may be accepted for the acquisition request for the specific right on the first resource.

In another aspect of the present invention, a method for requesting acquisition of a specific right on a specific resource in a wireless communication system, the method performed by a first application entity includes: transmitting a search request for the specific resource to a resource management entity, wherein the search request includes a search term for identifying the specific resource; receiving information about resource candidates acquired based on the search term, from the resource management entity; and transmitting, to the resource management entity, an acquisition request for a specific right on a first resource from among the resource candidates, wherein whether the first application entity has a right for the acquisition request for the specific right on the first resource is determined by the resource management entity, wherein whether the first application entity has a right for the acquisition request for the specific right is determined based on information indicated by a first attribute of a second resource for authenticating a acquisition request for a right on a resource, and the second resource may be under the first resource.

Preferably, the acquisition request for the specific right on the first resource from among the resource candidates may be a command for recording the specific right to acquire and information about the first application entity requesting acquisition of the specific right in a second attribute of the second resource.

Preferably, the acquisition request for the specific right on the first resource from among the resource candidates may be a command for authentication of the acquisition request for the specific right on the first resource, wherein the authentication is based on whether information about the first application entity and the specific right are recorded in a resource indicated by an attribute in which information about a right on the first resource is recorded, and the resource may be under the first resource.

Preferably, the specific right and the information on the first application entity requesting acquisition of the specific right may be recorded in a second attribute of the second resource if it is determined that the first application entity has a right for the acquisition request for the specific right on the first resource.

The aforementioned technical solutions are merely parts of embodiments of the present invention and various embodiments in which the technical features of the present invention are reflected can be derived and understood by a person skilled in the art on the basis of the following detailed description of the present invention.

Advantageous Effects

According to an embodiment of the present invention, it is possible to secure compatibility between entities by performing a procedure in which an entity requests rights acquisition or change for a specific resource of another entity using a means which is common to the entities.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present invention, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
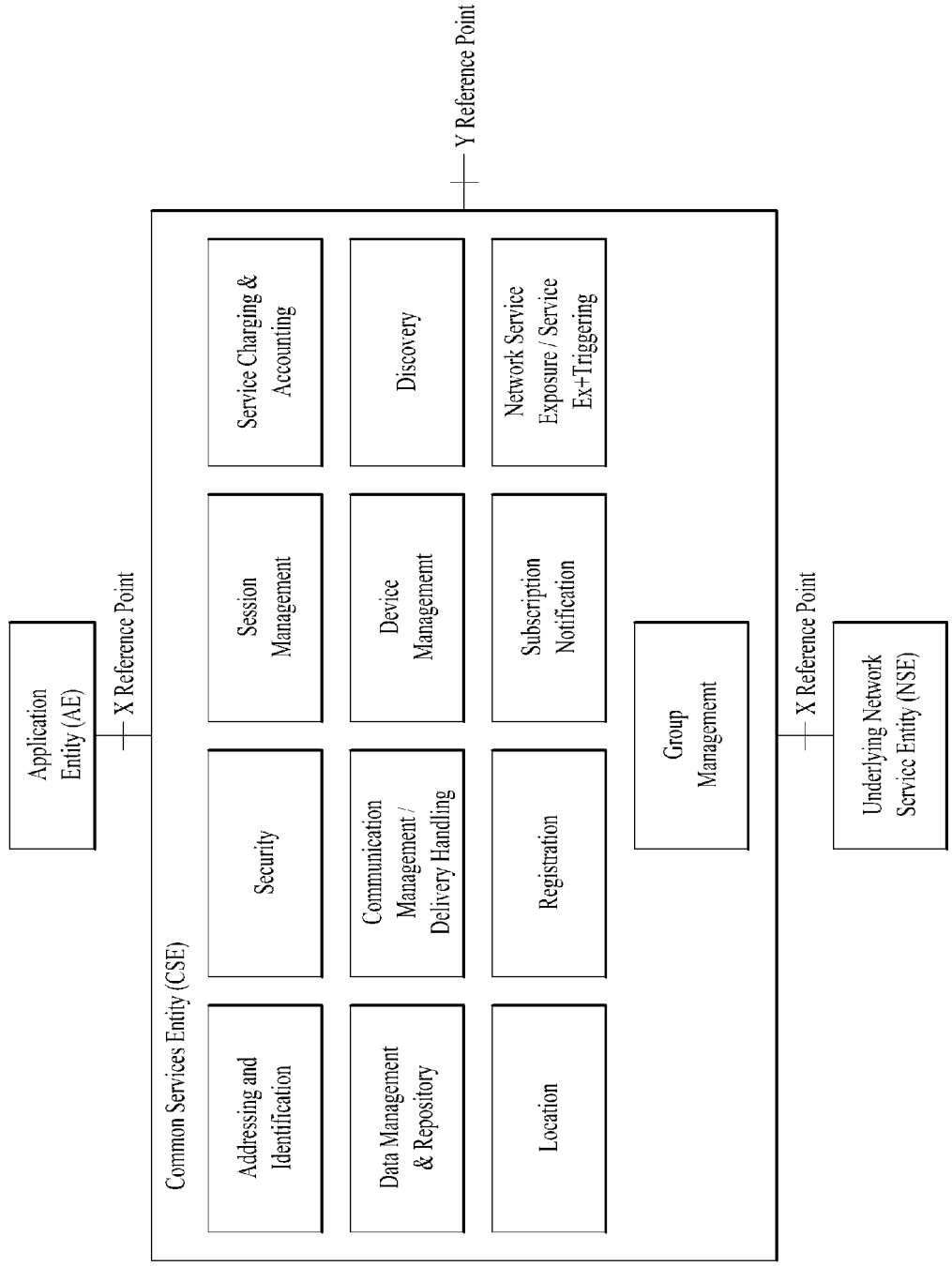
FIG. 1 illustrates an M2M framework.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification", as shown in FIG. 1. M2M applications use the M2M service functions provided by the oneM2M service framework through an X reference point or other oneM2M service frameworks use the M2M service functions through a Y reference point. Further, the M2M service functions may be executed in connection with an underlying network (or underlying network entity (UNE) (e.g. 3GPP, 3GPP2, WiFi and Bluetooth))

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways. Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

All oneM2M devices/gateways/infrastructures do not have higher functions and may have mandatory functions and some optional functions from among the corresponding functions.

Figure 2:
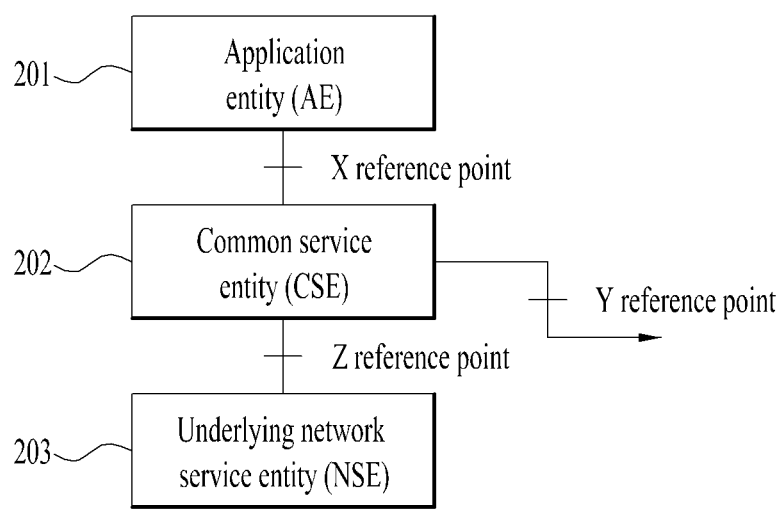
FIG. 2 illustrates an architecture of an M2M service framework.

FIG. 2 illustrates the architecture of an M2M service framework at a high level. Each entity will now be described.

Application entity (AE, 201): Application entity provides application logic for end-to-end M2M solutions. Examples of the application entity include fleet tracking application, remote blood sugar monitoring application, remote power metering and controlling application.

Common service entity (CSE, 202): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 203): provides services to the CSEs. Examples of such services include device management, location services and device triggering. No particular organization of the NSEs is assumed. Note: underlying networks provide data transport services between entities in the oneM2M system. Such data transport services are not included in the NSE.

The reference points shown in FIG. 2 will now be described.

X Reference Point

This is the reference point between an AE and a CSE. The X reference point allows the CSE to communicate with the AE such that the AE can use the services provided by the CSE.

The services provided through the X reference point are dependent on the functionality supported by the CSE. The AE and the CSE may or may not be co-located within the same physical entity.

Y Reference Point

This is the reference point between two CSEs. The Y reference point allows a CSE to use the services of another CSE in order to fulfill needed functionality. Accordingly, the Y reference point between two CSEs is supported over different M2M physical entities. The services offered via the Y reference point are dependent on the functionality supported by the CSEs.

Z Reference Point

This is the reference point between a CSE and an NSE. The Z reference point allows a CSE to use the services (other than transport and connectivity services) provided by the NSE in order to fulfill the needed functionality.

Figure 3:
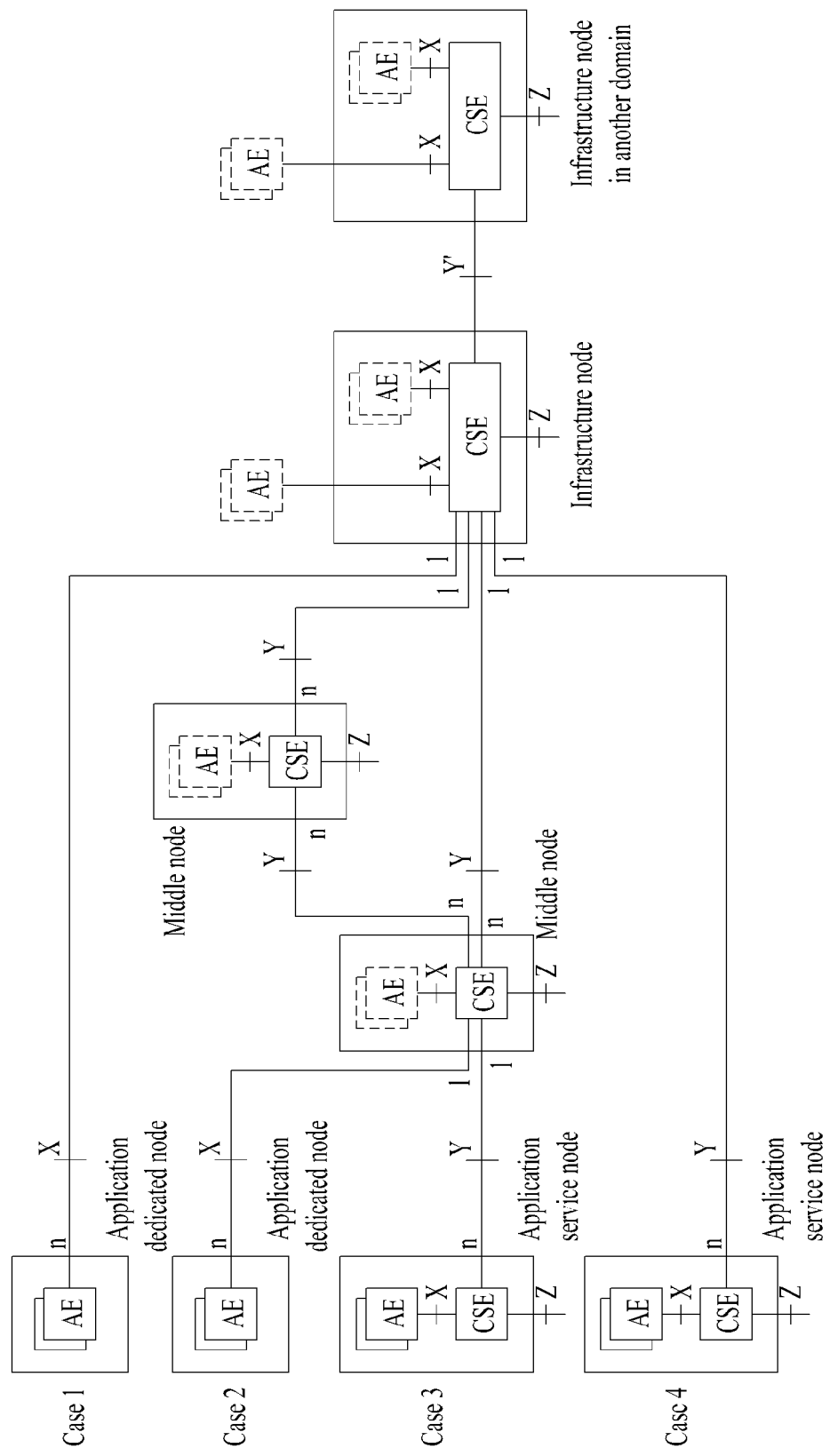
FIG. 3 illustrates an architecture of an M2M service framework.

FIG. 3 illustrates the M2M architecture of oneM2M.

Application Dedicated Node (ADN): An application dedicated node is a node that contains at least one M2M application and does not contain a CSE. The ADN can communicate over an X reference point with one middle node or one infrastructure node. The AND can be present in an M2M device.

Application Service Node (ASN): An application service node is a node that contains at least one CSE and has at least one M2M application. The ASN can communicate over a Y reference point with one middle node or one infrastructure node. The ASN can be present in an M2M device.

Middle Node (MN): A middle node is a node that contains at least one CSE and may contain M2M applications. The middle node communicates over a Y references point with at least two nodes belonging to the following different category:

one or more ASNs;
one or more middle nodes (MNs); and
one infrastructure structure.

The MN can be connected with the ADN through an X reference point. The MN can be present in an M2M gateway.

Infrastructure Node (IN): An infrastructure node is a node that contains one CSE and may contain ANs. The IN can be present in M2M infrastructure.

The IN communicates over a Y reference point with either:

one or more middle nodes; and/or
one or more application service nodes.

The IN may communicate with one or more ADNs over one or more X reference points.

Figure 4:
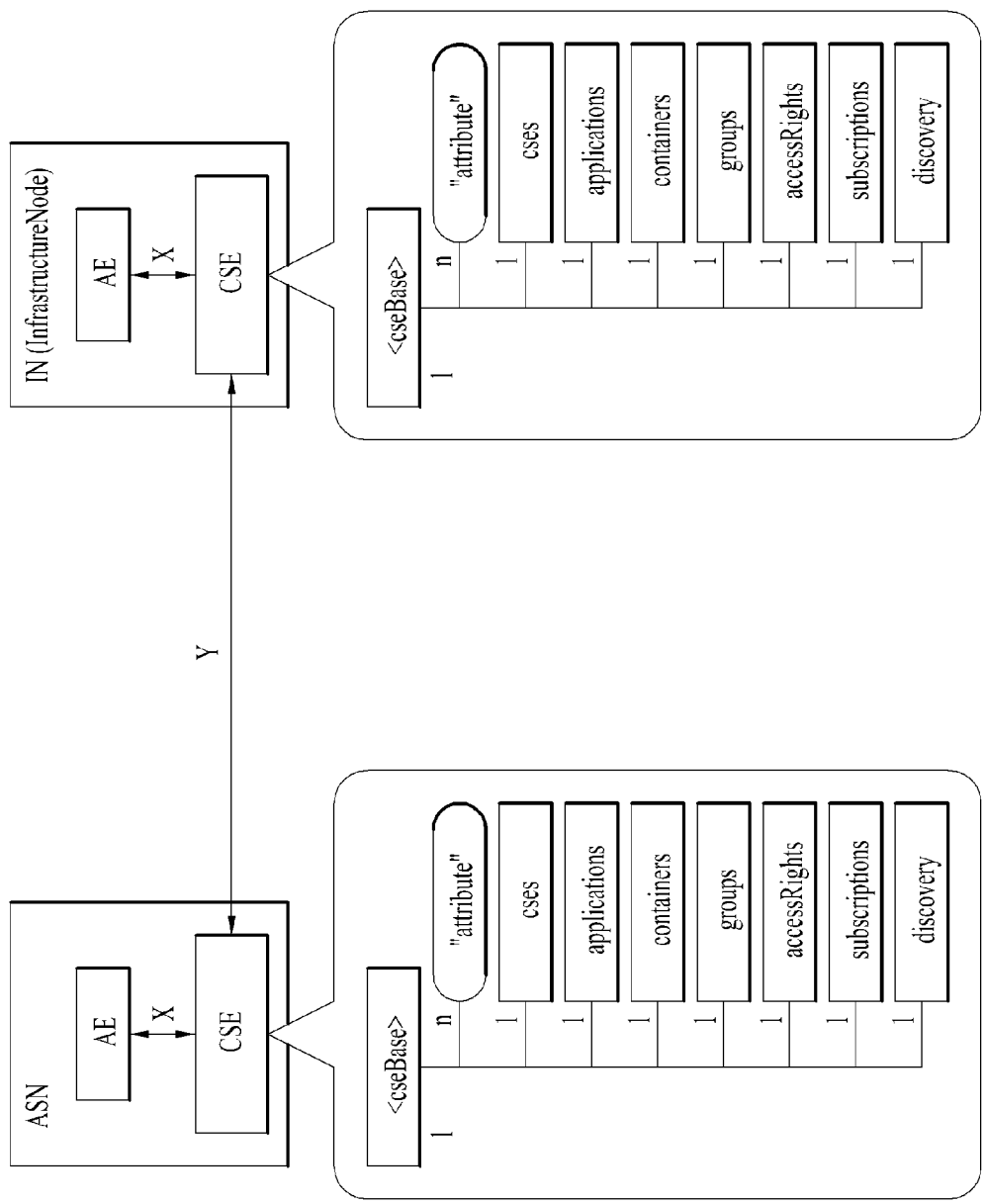
FIG. 4 illustrates structures of resources present in an M2M application service node and an M2M infrastructure node.

FIG. 4 illustrates structures of resources present in an M2M application service node and an M2M infrastructure node.

The oneM2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a cseBase as a tree root. Representative resources are described below.

cseBase resource: this is a root resource of oneM2M resources configured in a tree and includes all other resources.

cse resource: this is a resource that is lower than cseBase/cses and includes information on other CSEs registered (connected) with the corresponding CSE.

Application resource: this is a resource that is lower than cseBase/applications or cseBase/cses/specific cse/applications, stores information on applications registered (connected) with the corresponding CSE when present under cseBase/applications, and stores information on applications registered with other CSEs (in the name of CSE) when present under cseBase/cses/specific cse/applications.

AccessRight resource: this is a resource that is lower than accessRights and stores information associated with access rights. Authentication is performed using access rights information included in this resource.

Container resource: this is a resource that is lower than containers and stores data per CSE or M2M application.

Group resource: this is a resource that is lower than groups and provides a function of grouping a plurality of resources and simultaneously processing the grouped resources.

Subscription resource: this is a resource that is lower than subscriptions and executes a function of announcing a state change such as a resource value change through notification.

Discovery resource: this is a resource that is lower than cseBase and is used to discover a specific resource.

Figure 5:
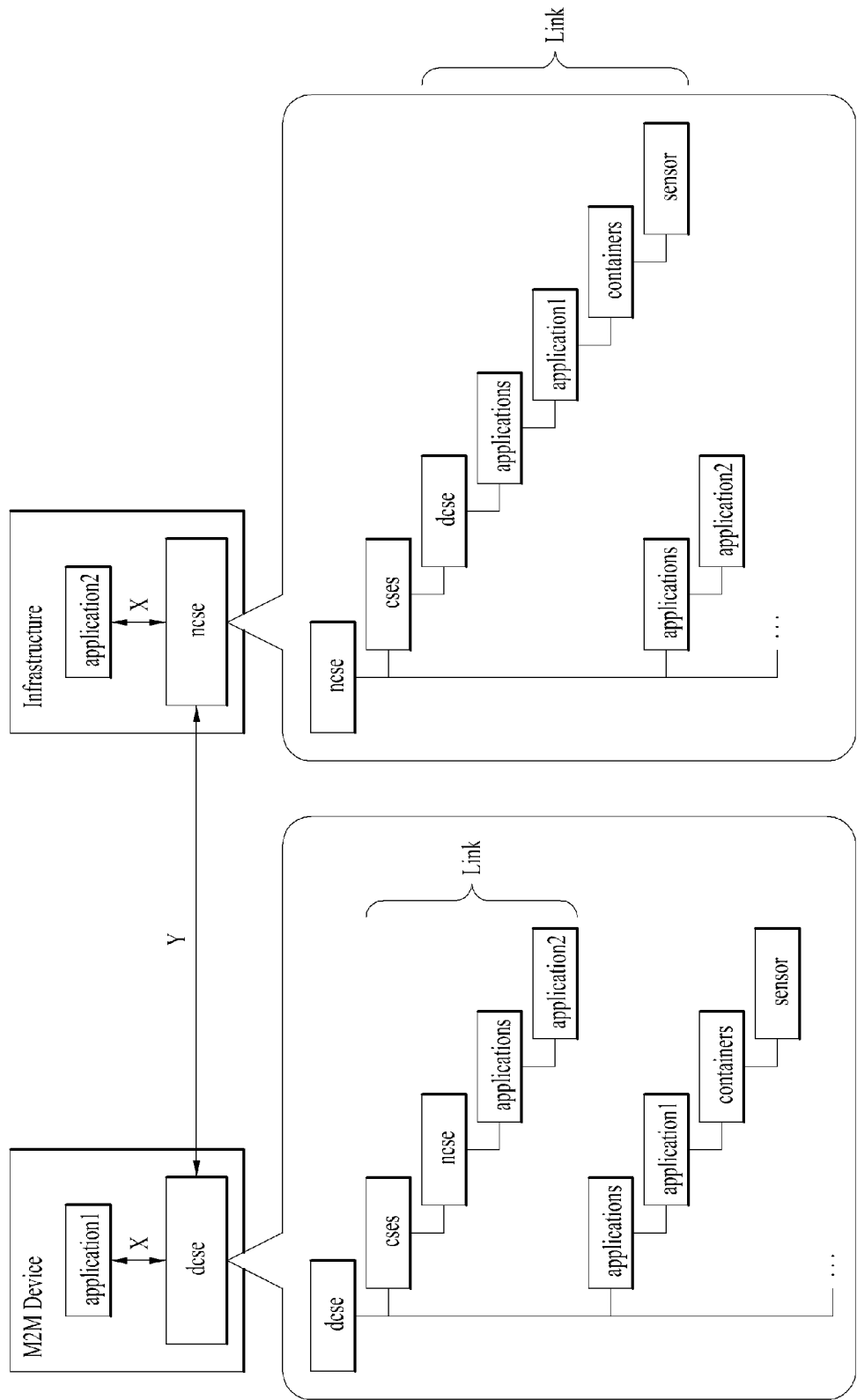
FIG. 5 illustrates structures of resources present in an M2M application service node (e.g. M2M device) and an M2M infrastructure node.

FIG. 5 illustrates structures of resources present in an M2M application service node (e.g. M2M device) and an M2M infrastructure node.

A description will be given of a method by which an AE (application 2) registered in the M2M infrastructure node reads a value of a sensor of the M2M device, for example. The sensor normally refers to a physical device, and an AE (application 1) present on the M2M device reads the value from the sensor and stores the read value in the form of a container resource in a CSE in which the AE is registered. To this end, the AE present on the corresponding M2M device needs to be pre-registered in the CSE present in the M2M device. Upon registration, M2M application related information registered in the form of dcse/applications/application1 resource is stored, as shown in FIG. 5.

When the sensor value is stored in the container resource, which is lower than dcse/applications/application1 resource, by the AE present on the M2M device, the AE registered in the infrastructure node can access the corresponding value. To enable access, the AE registered in the infrastructure node needs to also be registered in the CES (ncse) of the infrastructure node. This is achieved by storing information on application 2 in ncse/applications/application 2 resource, as in the method of registering application 1 in dcse. Application 1 communicates with application 2 via ncse and dcse rather than directly communicating with application 2. To this end, ncse and dcse need to pre-register with each other. When dcse is registered in ncse, dcse related information (e.g. link) is stored under ncse/cses/dcse resource. That is, the dcse related information is information (e.g. URI information) indicating the position at which the dcse related information is stored. Accordingly, application 2 obtains a path through which information on application 1 is accessible and can read the sensor value through the path.

In addition, information, which indicates the position at which information related to the CSE (ncse) in which the application (application 2) of the M2M infrastructure node is registered is stored, may be stored in the CSE (dcse) in which the application (application 1) of the M2M device is registered.

Figure 6:
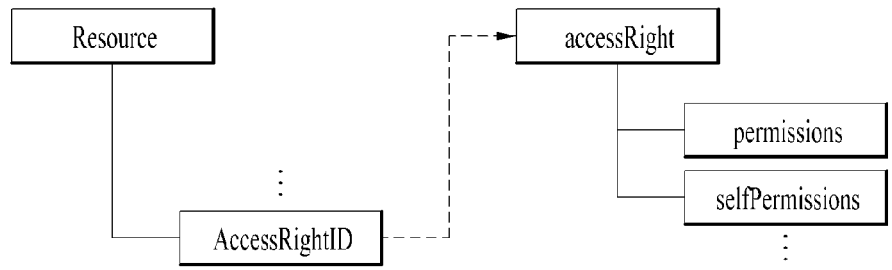
FIG. 6 illustrates an access right resource from among M2M related resources.

FIG. 6 illustrates the access right resource from among M2M related resources.

oneM2M stores the access right resource separately from a resource to which the access right has been applied. The resource to which the access right has been applied has only AccessRightID (URI of the access right resource) of the access right resource. Accordingly, AccessRightID needs to be referred to in order to check the access right of a specific resource.

Referring to FIG. 6, the access right for "Resource" resource is stored in "AccessRightID" resource lower than "Resource" resource. More specifically, "AccessRightID" resource stores the URI of the resource (i.e. "AccessRight" resource on the right side of FIG. 6) storing the access right.

Main attributes of "AccessRight" resource include permissions and selfPermissions. Permissions contain the contents of entities (permissionHolders) and rights (permissionFlags) allocated to the entities, and selfPermissions contains the contents of entities having rights to change permissions of the "AccessRight" resource.

An exemplary permissions attribute is as follows.

```
<permissions>
    <permission id="first">
        <permissionFlags>
            <flag>READ</flag>
            <flag>WRITE</flag>
        </permissionFlags>
        <permissionHolders>
<holderRefs><holderRef>http://m2m.operator.org/groups/group1</holderRef>
    <holderRef>http://gw1.operator.org/base </holderRef>
            </holderRefs>
        </permissionHolders>
</permission>
    <permission                                     id="second">
        <permissionFlags>
            <flag>READ</flag>
            <flag>WRITE</flag>
        </permissionFlags>
        <permissionHolders>
            <holderRefs>
<holderRef>http://m2m.operator.org/groups/group2</holderRef>
</holderRefs>
<domains>
<domain>http://m2m.operator.org/scls/someScl</domain>
<domain>http://another.operator.org/           </domain><domains>
            </permissionHolders>
        </permission>
</permissions>
```

Figure 7:
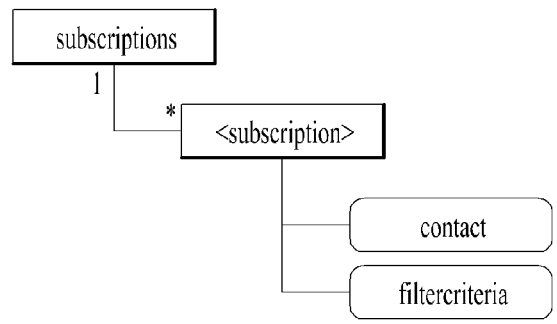
FIG. 7 illustrates a resource for a subscription function.

FIG. 7 illustrates resources for a subscription function. The subscription function can be used to check a change in a resource. That is, when sibling resources of the subscription resource are changed, the subscription function notifies a specific entity of the change of the resources.

As shown in FIG. 7, a plurality of "subscription" resources may be present in the "subscriptions" resource, and "contact" and "filterCriteria" attributes are present in each subscription resource. In the case of a resource indicated by "< >", the name of the resource can be determined when actually instantiated.

Notifying a specific entity of change of resources is performed as follows. When the sibling resources of "subscriptions" resource are changed and the change satisfies conditions specified in the filterCriteria attribute of each subscription, an entity recorded in the contact attribute can be notified of the change of the resources.

A description will be given of a function of discovering a resource matched to a specific condition in a CSE. Applications are not aware of resources present in a CSE connected thereto or other CSEs connected to the CSE, in general. Accordingly, an application can transmit a request for discovery of the specific resource to a CSE connected thereto. To this end, a discovery procedure is used.

An application provides a prefix (e.g. /cseBase/applications) of the resource to be discovered to the "discovery" resource using a retrieve (read) command and specifies information of the resource to be discovered through "filterCriteria". A CSE that has received the command can discover the resource that satisfies "filterCriteria" from among lower resources specified in the prefix and transmit the discovery result to the application.

When an entity does not want to open a resource to other entities, the entity may not provide the access right for the discovery resource lower than the corresponding resource to any entity. Otherwise, the entity may provide the access right only to a specific entity to which the entity wants to open the resource.

Figure 8:
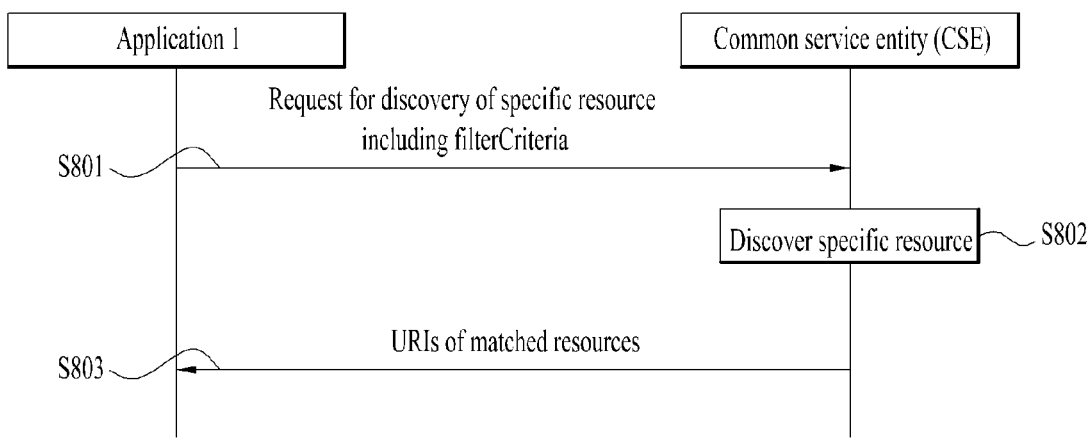
FIG. 8 illustrates a procedure of discovering a specific resource.

The discovery procedure will now be described in more detail with reference to FIG. 8.

An entity (e.g. application 1) that intends to discover a specific resource can search a specific CSE (including a CSE connected to the corresponding CSE and application resources) for the resource. To this end, application 1 can request discovery of resources of the specific CSE (S801). The request can include the prefix and filterCriteria. The filterCriteria must be included in the request. The specific CSE can search lower resources of the prefix for a resource matched to the filterCriteria condition (S802) and transmit the URI of the resource matched to the condition to application 1 (S803).

The following table describes the filterCriteria. However, the table is exemplary and does not limit the present invention. The filterCriteria can be applied to both discovery and subscription.

TABLE 1

| Name | Type | Predefined values and examples | Description |
|---|---|---|---|
| ifModifiedSince | DateTime[0 . . . 1] | | A resource matches this criterion if the lastModified attribute of the resource is greater than ifModifiedSince parameter (A resource matches this criterion if and only if the lastModified attribute of the resource is chronologically after the specified value. It is |

TABLE 1-continued

| Name | Type | Predefined values and examples | Description |
| --- | --- | --- | --- |
| | | | specifically useful to suppress the initial notify when used in a create subscription.) |
| ifUnmodifiedSince | DateTime[0 . . . 1] | | A resource matches this criterion if the lastModifiedAttribute of the resource is chronologically before ifUnmodifiedSince parameter (A resource matches this criterion if and only if the lastModifiedAttribute of the resource is chronologically before the specified value.) |
| searchString | String[0 . . . unbounded] | | A resource matches this criterion if searchString parameter is the same as one of the searchString values in the searchStrings attribute of the resource. When searchString parameter includes multiple searchStrings, a resource matches the criterion only if all the searchStrings match the criterion. (A resource matches this criterion if the resource has a searchStrings attribute and one of the searchString values in the searchStrings attribute is the same as the specified value. If multiple searchStrings are specified, the logical operation is AND, i.e. only resources that contain all the specified searchStrings match the criterion.) |
| createdAfter | DateTime[0 . . . 1] | | Only a resource generated after a specified time is filtered. A resource matches this criterion only if createdAfter parameter is chronologically before the creationTime attribute of the resource. (A resource matches this criterion if and only if the creationTime attribute of the resource is chronologically after the specified value.) |
| createdBefore | DateTime[0 . . . 1] | | Only a resource generated before a specified time is filtered. A resource matches this criterion only if createdBefore parameter is chronologically after the creationTime attribute of the resource. (A resource matches this criterion if and only if the creationTime attribute of the resource is chronologically before the specified value.) |

SearchString in the filterCriteria can function as a search term for a resource to be discovered. That is, application 1 can select a search term that characterizes a resource to be discovered and include the search term in the searchString. For this, the CSE can search resources registered therein for the resource matched to the searchString and transmit the matched resource to application 1.

The conventional M2M architecture does not define a procedure of obtaining the right on a specific resource in standards. That is, the procedure is preconfigured or the right is provided through a method other than the method defined in the standards. While this method can be defined as a solution when one CSE serving as an M2M server is present, the solution cannot be used in a multi-M2M service provider environment in which communication between CSEs is performed. Accordingly, there is a need for a method for requesting a right on a specific resource and obtaining a response to the request. The present invention provides methods for right request, notification and response in a multi-M2M service provider environment.

Requests for rights acquisition or change in the M2M architecture according to an embodiment of the present invention can be divided into rights acquisition/change request through a resource and rights acquisition/change request through a command.

Figure 9:
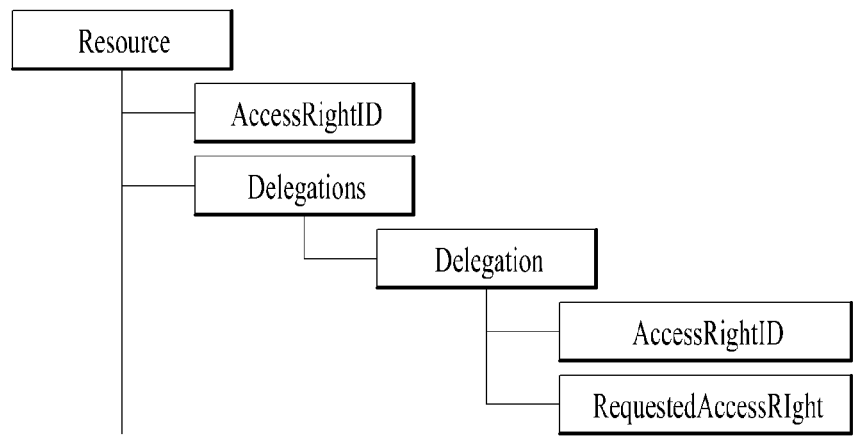
FIG. 9 illustrates a rights acquisition/change request procedure for a specific resource.
Figure 9:
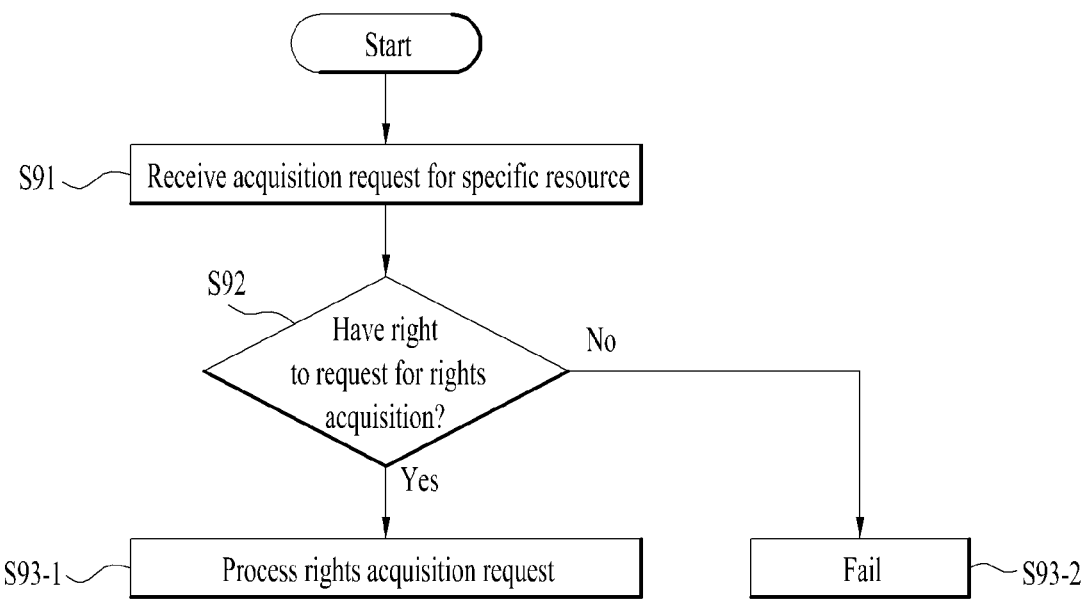

The rights acquisition/change request through a resource will now be described with reference to FIG. 9(a). It is assumed that application 1 requests acquisition of a right (e.g. "read" right) on a specific resource, "Resource", in an embodiment of the present invention. The specific resource is stored in a specific entity (e.g. a common service entity (CSE)) and assumed as a resource storing weather prediction information of a specific area. In general, application 1 cannot be directly aware of the address (e.g. URI) of "Resource". Accordingly, application 1 can request the CSE to provide the resource on the weather prediction information of the specific area through the aforementioned discovery function and obtain the resource.

For the aforementioned rights acquisition/change through a resource, a specific resource may be configured such that the resource has "Delegations" resource as a lower resource thereof. The "Delegations" resource may have at least one "Delegation" resource and have at least one "RequestedAccessRight" attribute under the at least one "Delegation" resource. Application 1 may request rights acquisition/change for the specific resource by correcting the "RequestedAccessRight" attribute.

Alternatively, for the aforementioned rights acquisition/change through a resource, a specific resource may be configured such that the resource has "Delegation" resource as a lower resource thereof. The "Delegation" resource may have at least one "RequestedAccessRight" attribute. Application 1 may request rights acquisition/change for the specific resource by correcting the "RequestedAccessRight" attribute.

The resource set "Delegations (or Delegation)" is present in order to provide an interface through which the right for the specific resource can be offered to entities other than the entity having the specific resource.

Application 1 is a means for requesting rights acquisition for the specific resource and executes a write command on the "RequestedAccessRight" attribute lower than the "Delegation" resource of the specific resource (S91). The command may include the ID of application 1 and the right (e.g. read) to acquire.

The CSE may determine whether application 1 has the right to request rights acquisition for the specific resource. That is, the CSE storing the "RequestedAccessRight" attribute can determine whether application 1 has the right for the write command for an attribute (e.g. permissions) of a specific resource indicated by "AccessRightID" attribute, which is a sibling of the "RequestedAccessRight" attribute (S92).

If the "AccessRightID" attribute is not specified, the CSE may determine whether application 1 has the right for the write command for the permissions indicated by the "AccessRightID" attribute of a higher resource in the resource structure. When the "AccessRightID" attribute of the higher resource is not specified, whether the "AccessRightID" attribute of a higher resource of the higher resource is specified is checked. This procedure is repeated until a higher resource having the "AccessRightID" attribute which is specified is discovered.

When application 1 has the right to request rights acquisition, that is, the right for the write command, the rights acquisition request of application 1 is successful and the CSE can process the rights acquisition request. That is, acquisition of the read right of application 1 can be recorded in the "RequestedAccessRight" attribute. That is, the ID and the read command of application 1 can be recorded in the "RequestedAccessRight" attribute (S93-1). In addition, authentication for the rights acquisition/change is performed.

However, if application 1 has no right for the rights acquisition, that is, if application 1 has no right for the write command, application 1 fails in the rights acquisition request (S93-2). The means for the rights acquisition request (e.g. write command) and the right to acquire are exemplary and do not limit the scope of the present invention.

Figure 10:
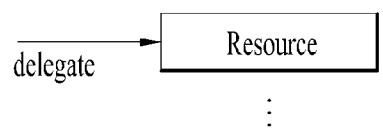
FIG. 10 illustrates a rights acquisition/change request procedure for a specific resource.
Figure 10:
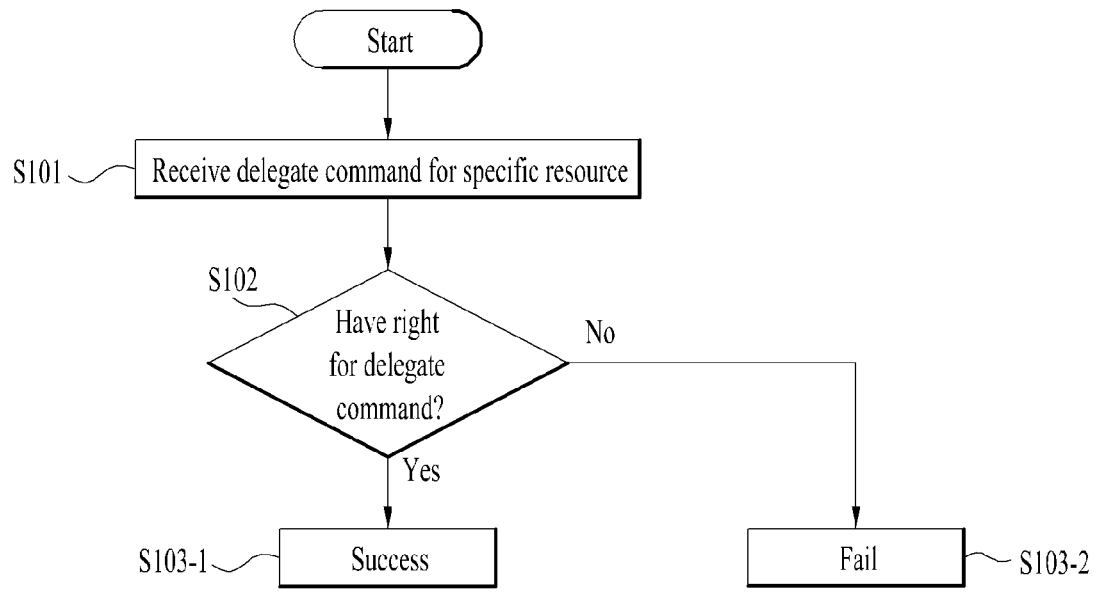

FIG. 10(a) illustrates a rights acquisition/change request through a command This is a method of performing a rights acquisition/change request by executing a specific command on a resource that requires a right to be accessed. For example, the "delegate" command is transmitted to the resource that requires a right to be accessed.

Application 1 that intends to acquire a right for a specific resource "Resource" shown in FIG. 10(a) transmits "delegate" command to the specific resource (S101). The "delegate" command may include the ID of application 1 and the right to acquire (e.g., read).

A CSE having the specific resource may check whether application 1 has the right to execute the "delegate" command (S102). Specifically, the CSE can check whether application 1 has the right to execute the "delegate" command by determining whether the right of application 1 for the "delegate" command, that is, information on application 1 and the "delegate" command are recorded in an attribute (e.g. permissions) of the specific resource, indicated by the "AccessRightID" attribute of the specific resource.

If application 1 has the right, the rights acquisition/change request is successful (S103-1) and authentication for the rights acquisition/change is performed. If application 1 does not have the right, the rights acquisition/change request ends in failure (S103-2).

The entity (e.g. CSE) that can provide the right on the specific resource may or may not accept the rights acquisition/change request for the specific resource.

The method for requesting rights acquisition/change through a resource can block a rights acquisition/change request by not assigning the "write" right to the "delegate" resource.

The method for requesting rights acquisition/change through a command can block a rights acquisition/change request by not giving the right for the "delegate" command to the entity that transmits the request.

The request may be partially blocked. That is, when the entity that can give the right for the specific resource has information such as delegation permission domain/IP (e.g. www.XXX.com/*) in the specific resource, the entity can give the right to entities included in a specific range.

As described above, rights acquisition/change for a specific resource, which can be permitted by a specific entity for other entities, is requested through a "resource manager" called a CSE, instead of being directly requested between the entities. Accordingly, the request for rights acquisition/change on the specific resource can be transmitted between the entities and the request can be verified without directly defining a means for the request between the entities. If a means for transmitting the rights acquisition/change request between the entities and verifying the request is specified without using the means such as the CSE, then n*(n−1)/2 new authentication means are needed when the number of entities that need to operate in association within one M2M network is n. In other words, the means such as the CSE can be used in order to secure compatibility between different entities and such means is a simple, stable and efficient authentication means compared to an individual authentication means for compatibility between entities.

A description will be given of an authentication procedure for a rights acquisition/change request. The authentication procedure is initiated by notifying the entity, which can change the right for the specific resource that is a target of the rights acquisition/change, of the request in order to determine whether rights acquisition/change is permitted, upon successful rights acquisition/change request.

The initiation of notification may be performed by transmitting information on the initiation by the entity (e.g. CSE) storing the specific resource to the entity that can change the right for the specific resource, or through the subscription function.

Figure 11:
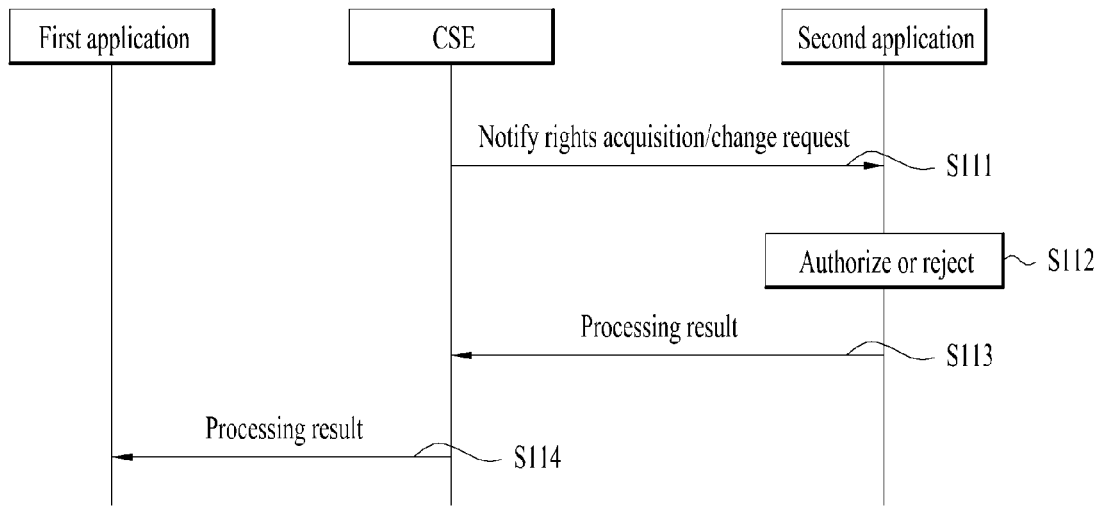
FIG. 11 illustrates a procedure of notifying a rights acquisition/change request for a specific resource.

The former will now be described first with reference to FIG. 11.

Upon successful completion of the rights acquisition/change request for the specific resource, the CSE storing the specific resource notifies the entity (e.g. application 2) capable of changing the right for the specific resource of the rights acquisition/change request (S111). A plurality of entities may change the right for the specific resource, which will be described later. Application 2 can give the right to the entity (e.g. application 1) that requests the rights acquisition/change for the specific resource or reject the request, according to policy thereof (S112). Here, the right given by application 2 to application 1 may differ from the right requested by application 1. That is, application 2 may give only part of requested right to application 1.

Application 2 may transmit the authentication result to the CSE (S113). The result may include the right actually given by application 2 to application 1 or a message (e.g. rejection of authorization, successful authorization or successful partial authorization) related to authorization.

Thereafter, the CSE may transmit the result to application 1 (S114).

Figure 12:
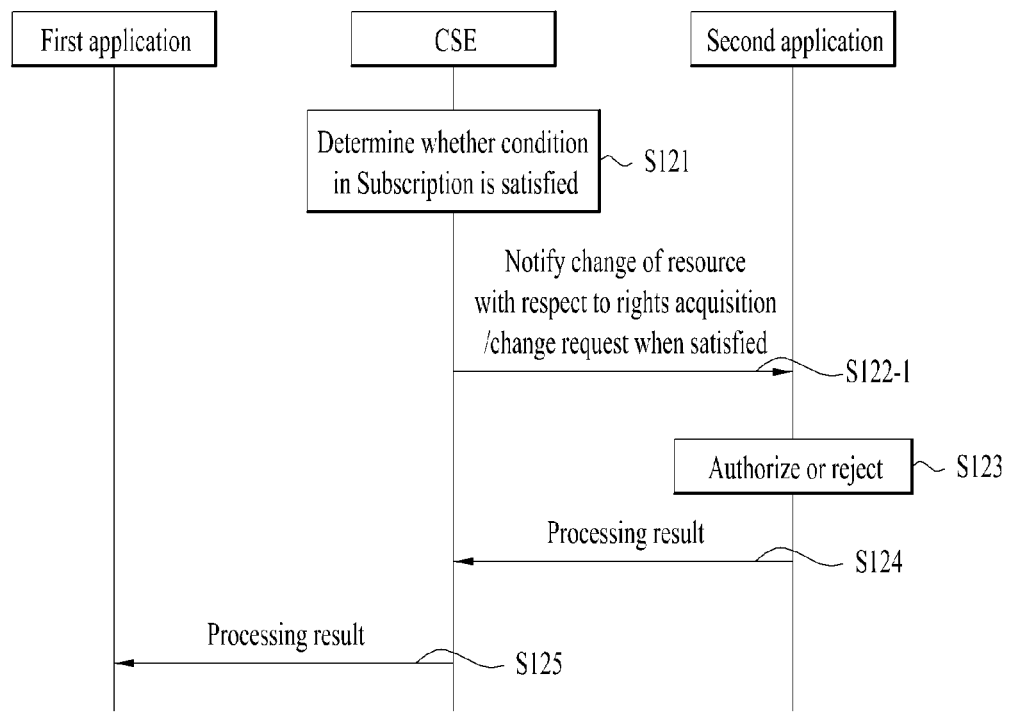
FIG. 12 illustrates a procedure of notifying a rights acquisition/change request for a specific resource.

A description will be given of an authorization procedure for a rights acquisition/change request through the subscription function with reference to FIG. 12.

The procedure uses the subscription function of oneM2M shown in FIG. 7. The subscription function can be used when the rights acquisition/change request method is based on "delegation resource". Subscription is a method of notifying a specific entity (which is specified in "contact" attribute) of change of sub-resources of a 1-level parent resource when the sub-resources are changed. That is, in the case of subscription of a specific resource, a defined contact is notified of a changed resource when the specific resource has been changed.

When subscription is applied to authorization for the specific resource, "subscriptions" resource (or subscription) is additionally present as a sibling of "delegation" resource in the example of FIG. 7.

The "subscriptions" resource is used to notify an entity (e.g. entity specified in SelfPermissions indicated by AccessRightID under the "delegation" resource (including lower resources thereof)) of change of the "delegation" resource, when the "delegation" resource is changed.

When the rights acquisition/change request is successfully completed and the "delegation" resource is changed, the CSE storing the specific resource, which is a target of the rights acquisition/change request, checks whether filterCriteria (detailed condition for notification) of subscription is satisfied (S121) and notifies the URI of "contact" resource of the subscription resource that the corresponding resource has been changed (S122-1) when filterCriteria is satisfied. When filterCriteria is not satisfied, the procedure is ended (S122-2).

The entity indicated by the contact, that is, application 2 capable of changing the right for the specific resource, may confirm change of the "delegation" resource and give the right to the entity that requests rights acquisition/change, for example, application 1, or reject authorization, according to a policy thereof (S123). Further, application 2 may give only part of the requested right to application 1.

Application 2 transmits the result of authorization to the CSE storing the specific resource (S124). The result may include the right actually given by application 2 and an authorization related message (e.g. rejection of authorization, successful authorization and successful partial authorization).

The CSE may generate an acknowledgement message for the request on the basis of the result and transmit the acknowledgement message to the entity (i.e. application 1) that requests rights acquisition/change (S125).

A description will be given of a case in which a plurality of entities can change the right for the specific resource.

A plurality of entities may give the right to access the specific resource. Accordingly, it is important to decide targets that will be notified of a rights acquisition/change request for the specific resource.

Sequential Notification

The entities capable of giving the right for the specific resource are sequentially notified of generation of the rights acquisition request. When one of the entities gives the right, the entities are not notified of generation of the rights acquisition request.

Notification to All Entities

All entities capable of giving the right for the specific resource are notified of generation of the rights acquisition request. When one of the entities gives the right, authorization of the other entities can be ignored. In this case, the other entities can be notified of rejection of authorization. Alternatively, maximum (minimum) right from among the rights given by all the entities can be actually given to the entity that requests rights acquisition/change.

Notification According to Request Entity

The entity (i.e. the CSE in the above example) that has received the request can select one of the entities capable of giving the right on the basis of information (source information) of the entity (e.g. application 1) that requests rights acquisition/change for the specific resource and notify the selected entity of generation of the request.

Transmission of Acquisition Request to Entity Indicated in Rights Acquisition/Change Request When the rights acquisition/change request includes a target to which notification of generation of the request will be transmitted, the notification can be sent to the entity corresponding to the target. In this case, the entity that requests rights acquisition/change for the specific resource is aware of the entities capable of giving the right. The entity can be aware of the entities capable of giving the right through a discovery procedure.

The notification of the request may be transmitted to a plurality of targets. In this case, the notification may be sequentially transmitted to the targets according to a rights acquisition/change request preference list or notification targets may be selected according to a policy of the entity that has received the request.

Dedicated Entity that Processes Right Request

A dedicated entity that processes a right request for a corresponding resource or an access right related value of the corresponding resource may be set. In this case, the notification of the request is transmitted to the dedicated entity.

In addition, an entity capable of giving the right for the specific resource can perform authorization through a policy thereof. The entity can perform authorization using information about an entity that requests rights acquisition, a requested resource and whether charging is approved if charging is needed.

Figure 13:
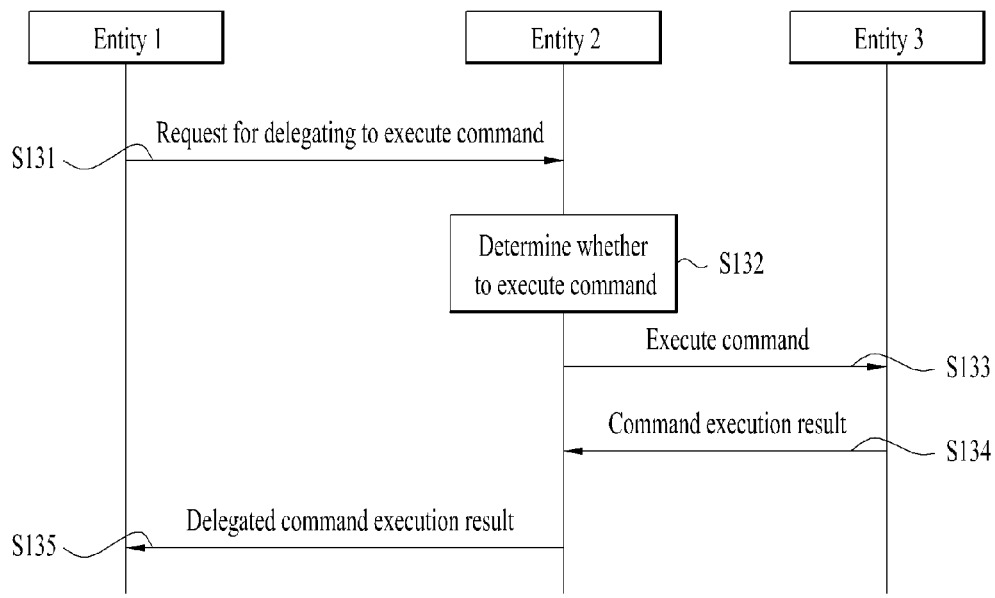
FIG. 13 illustrates an example of rights acquisition/change for a specific resource.

FIG. 13 illustrates an example of rights acquisition/change for a specific resource according to another embodiment of the present invention.

The present embodiment relates to a method by which an entity is delegated to execute a command (operation or message) for a specific resource of a specific entity. That is, when entity 1 wants to execute a command for entity 3, that is, entity 1 wants to execute a command for a specific resource located in entity 3, but entity 1 has no right to execute the command, entity 1 requests entity 2 having the right to execute the command (S131). Entity 2 can determine whether to execute the command according to a policy (S132), execute the command for entity 3 upon determining that the command is executed (S133) and receive a command execution result from entity 3 (S134). Then, entity 2 can transmit the command execution result to entity 1 (S135). Entity 3 determines that entity 2 requests the specific resource, irrespective of presence or absence of entity 1 and information on entity 1. The policy relates to the request entity, charging information, whether the corresponding resource can be shared, request available period information and the like, and entity 2 can determine whether to execute the command on the basis of the policy.

Figure 14:
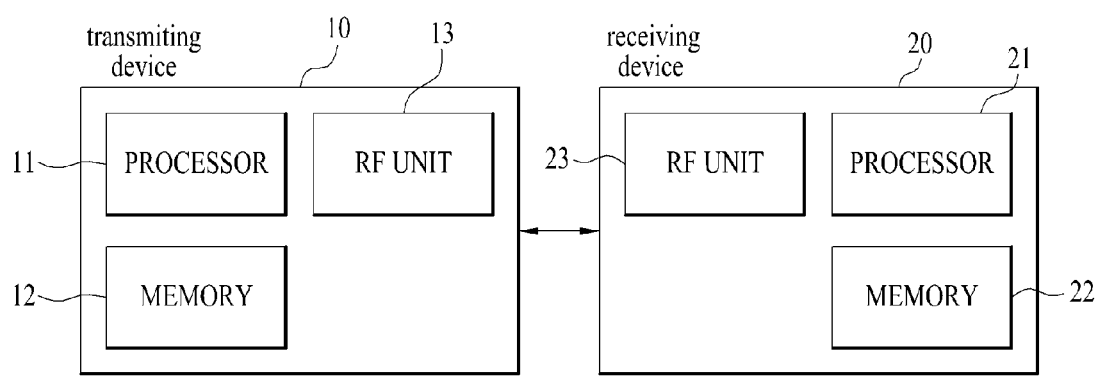
FIG. 14 is a block diagram of an apparatus for implementing embodiments of the present invention.

FIG. 14 is a block diagram of a transmitting device 10 and a receiving device 20 configured to implement exemplary embodiments of the present invention. Referring to FIG. 14, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, application (entity) or resource related entity etc. may operate as devices in which they are installed or mounted, that is, a transmitting device 10 or a receiving device 20.

The specific features of the application (entity) or the resource related entity etc. such as the transmitting device or the receiving device may be implemented as a combination of one or more embodiments of the present invention described above in connection with the drawings.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a base station, a server, or other apparatuses.

The invention claimed is:

1. A method for requesting acquisition of a specific right on a specific resource in a wireless communication system, the method performed by a resource management apparatus and comprising:

receiving, by the resource management apparatus, a search request for the specific resource from a first application apparatus, wherein the search request includes a search term for identifying the specific resource;

acquiring, by the resource management apparatus, information about resource candidates from among resources being managed based on the search term;

transmitting, by the resource management apparatus, the acquired information about the resource candidates to the first application apparatus;

receiving, by the resource management apparatus, from the first application apparatus, an acquisition request for a specific right on a first resource from among the resource candidates;

determining, by the resource management apparatus, whether the first application apparatus has a right for the acquisition request for the specific right on the first resource, wherein whether the first application apparatus has a right for the acquisition request for the specific right on the first resource is determined based on information indicated by a first attribute of a second resource for verifying the acquisition request for the specific right on the first resource, under the first resource;

transmitting, by the resource management apparatus, the acquisition request for the specific right on the first resource to a second application apparatus having a right to change a right on the first resource if it is determined that the first application apparatus has a right for the acquisition request for the specific right on the first resource; and receiving, by the resource management apparatus, a result of the acquisition request from a second application apparatus having a right to change the right on the first resource,
  wherein the result of the acquisition request includes information about a right, which is given by the second application apparatus, having smaller scope than the specific right.

2. The method according to claim 1, further comprising specifying, by the resource management apparatus, a second application apparatus having a right to change a right on the first resource based on information indicated by an attribute in which information about a right on the first resource is recorded, and the attribute is under the first resource.

3. The method according to claim 2, wherein, when a plurality of entities has a right to change the right on the first resource, the second application apparatus having a right to change the right on the first resource is specified according to the first application apparatus or specified as a dedicated apparatus designated to change the right on the first resource, from among the plurality of entities.

4. The method according to claim 1, wherein the acquisition request for the specific right on the first resource from among the resource candidates received from the first application apparatus is a command for recording the specific right and information about the first application apparatus requesting acquisition of the specific right, in a second attribute of the second resource.

5. The method according to claim 1, wherein the acquisition request for the specific right on the first resource from among the resource candidates received from the first application apparatus is a command for authentication of the acquisition request for the specific right on the first resource, and
  wherein the authentication is based on whether information about the first application apparatus and the specific right are recorded in a resource indicated by an attribute in which information about a right on the first resource is recorded and the resource is under the first resource.

6. The method according to claim 1, further comprising recording the specific right and the information about the first application apparatus requesting acquisition of the specific right in a second attribute of the second resource if it is determined that the first application apparatus has a right for acquisition request of the specific right on the first resource.

7. The method according to claim 6, further comprising notifying, by the resource management apparatus, one or more specific lower entities, indicated by an attribute of a third resource, of change of the second resource or the second attribute when the specific right and the information about the first application apparatus requesting acquisition of the specific right are recorded in the second attribute of the second resource.

8. The method according to claim 1, wherein if the acquisition request for the specific right on the first resource is accepted, the specific right and the information about the first application apparatus requesting acquisition of the specific right are recorded in a resource indicated by the attribute in which the first resource right information is recorded and the resource is under the first resource.

9. The method according to claim 1, wherein a right in a narrower range than the specific right is accepted for the acquisition request for the specific right on the first resource.

10. A resource management apparatus for requesting acquisition of a specific right on a specific resource in a wireless communication system, the resource management apparatus comprising:
  a receiver;
  a transmitter; and
  a processor coupled to the receiver and the transmitter,
  wherein the processor is configured to:
    control the receiver to receive a search request for the specific resource from a first application apparatus,
      wherein the search request includes a search term for identifying the specific resource,
    acquire information about resource candidates from among resources being managed based on the search term,
    control the transmitter to transmit the acquired information about the resource candidates to the first application apparatus,
    control the receiver to receive, from the first application apparatus, an acquisition request for a specific right on a first resource from among the resource candidates,
    determine whether the first application apparatus has a right for the acquisition request for the specific right on the first resource,
      wherein whether the first application apparatus has a right for the acquisition request for the specific right on the first resource is determined based on information indicated by a first attribute of a second resource for verifying the acquisition request for the specific right on the first resource, under the first resource,
    control the transmitter to transmit the acquisition request for the specific right on the first resource to a second application apparatus having a right to change a right on the first resource if it is determined that the first application apparatus has a right for the acquisition request for the specific right on the first resource, and
    control the receiver to receive a result of the acquisition request from a second application apparatus having a right to change the right on the first resource,
    wherein the result of the acquisition request includes information about a right, which is given by the second application apparatus, having smaller scope than the specific right.

11. The resource management apparatus according to claim 10, wherein the processor is further configured to specify a second application apparatus having a right to change a right on the first resource based on information indicated by an attribute in which information about a right on the first resource is recorded, and the attribute is under the first resource.

12. The resource management apparatus according to claim 11, wherein, when a plurality of entities has a right to change the right on the first resource, the second application apparatus having a right to change the right on the first resource is specified according to the first application apparatus or specified as a dedicated apparatus designated to change the right on the first resource, from among the plurality of entities.

13. The resource management apparatus according to claim 10, wherein the acquisition request for the specific right on the first resource from among the resource candidates received from the first application apparatus is a command for recording the specific right and information about the first application apparatus requesting acquisition of the specific right, in a second attribute of the second resource.

14. The resource management apparatus according to claim 10, wherein the acquisition request for the specific right on the first resource from among the resource candidates received from the first application apparatus is a command for authentication of the acquisition request for the specific right on the first resource, and
wherein the authentication is based on whether information about the first application apparatus and the specific right are recorded in a resource indicated by an attribute in which information about a right on the first resource is recorded and the resource is under the first resource.

15. The resource management apparatus according to claim 10, wherein the processor is further configured to record the specific right and the information about the first application apparatus requesting acquisition of the specific right in a second attribute of the second resource if it is determined that the first application apparatus has a right for acquisition request of the specific right on the first resource.

16. The resource management apparatus according to claim 15, wherein the processor is further configured to notify one or more specific lower entities, indicated by an attribute of a third resource, of change of the second resource or the second attribute when the specific right and the information about the first application apparatus requesting acquisition of the specific right are recorded in the second attribute of the second resource.

17. The resource management apparatus according to claim 10, wherein if the acquisition request for the specific right on the first resource is accepted, the specific right and the information about the first application apparatus requesting acquisition of the specific right are recorded in a resource indicated by the attribute in which the first resource right information is recorded and the resource is under the first resource.

18. The resource management apparatus according to claim 10, wherein a right in a narrower range than the specific right is accepted for the acquisition request for the specific right on the first resource.

* * * * *